US006523245B2

(12) United States Patent
Whiten et al.

(10) Patent No.: US 6,523,245 B2
(45) Date of Patent: Feb. 25, 2003

(54) AUTOMATED DRILL AND RIVET MACHINE

(75) Inventors: P. Alan Whiten, Savannah, GA (US); Rick Mullininx, Savannah, GA (US); Allen Crosby, Ellabell, GA (US)

(73) Assignee: Great Dane Limited Partnership, Chicago, IL (US)

( * ) Notice: Subject to any disclaimer, the term of this patent is extended or adjusted under 35 U.S.C. 154(b) by 0 days.

(21) Appl. No.: 09/902,457

(22) Filed: Jul. 10, 2001

(65) Prior Publication Data

US 2003/0009867 A1 Jan. 16, 2003

(51) Int. Cl.⁷ .......................... B23P 11/00; B23Q 39/02; B23B 39/08; B21J 15/10
(52) U.S. Cl. ...................... 29/524.1; 29/33 K; 29/34 B; 29/525.2; 227/69; 408/13
(58) Field of Search ................ 29/34 B, 33 K, 29/243.54, 243.53, 525.2, 524.1; 408/13, 130; 409/207; 227/64, 67, 69, 110, 111

(56) References Cited

U.S. PATENT DOCUMENTS

| | | | | |
|---|---|---|---|---|
| 4,098,556 A | * | 7/1978 | Sugimoto | 408/3 |
| 4,310,964 A | * | 1/1982 | Murphy | 29/281.1 |
| 4,662,556 A | * | 5/1987 | Gidlund | 227/111 |
| 4,885,836 A | * | 12/1989 | Bonomi et al. | 227/51 |
| 5,181,808 A | * | 1/1993 | Griggs et al. | 408/1 R |
| 5,248,074 A | * | 9/1993 | Speller et al. | 227/110 |
| 5,537,927 A | * | 7/1996 | Rogovein et al. | 101/415.1 |
| 5,577,315 A | * | 11/1996 | Givler | 29/243.54 |
| 5,664,311 A | * | 9/1997 | Banks et al. | 29/33 K |
| 5,910,894 A | * | 6/1999 | Pryor | 219/121.64 |
| 6,003,812 A | * | 12/1999 | Micale et al. | 244/117 R |
| 6,088,897 A | * | 7/2000 | Banks et al. | 227/51 |
| 6,172,374 B1 | * | 1/2001 | Banks et al. | 227/69 |

FOREIGN PATENT DOCUMENTS

JP    2001079637 A  *  3/2001  .................. 29/34 B

* cited by examiner

Primary Examiner—William Briggs
(74) Attorney, Agent, or Firm—Nelson Mullins Riley & Scarborough, LLP

(57) ABSTRACT

An automated drill and rivet machine is provided for riveting a work piece. The machine is moveable with respect to the work piece, and sensors locate sequential rivet sites along the work piece. A control system directs the movement and operation of the machine at sequential rivet sites for drilling and mashing. A method for automatically fastening components is provided including the steps of indexing an automated drill and rivet machine at a first work site and placing the machine in a first mode in which the machine to repeatedly performs the steps of drilling, storing the work site location, sensing a next work site, and moving the machine to the next work site. The operator then inserts a fastener at the previous drilling work sites and places the machine in a second mode in which the machine repeatedly performs the steps of returning to a previous work site and mashing the rivets at the previous work site.

38 Claims, 11 Drawing Sheets

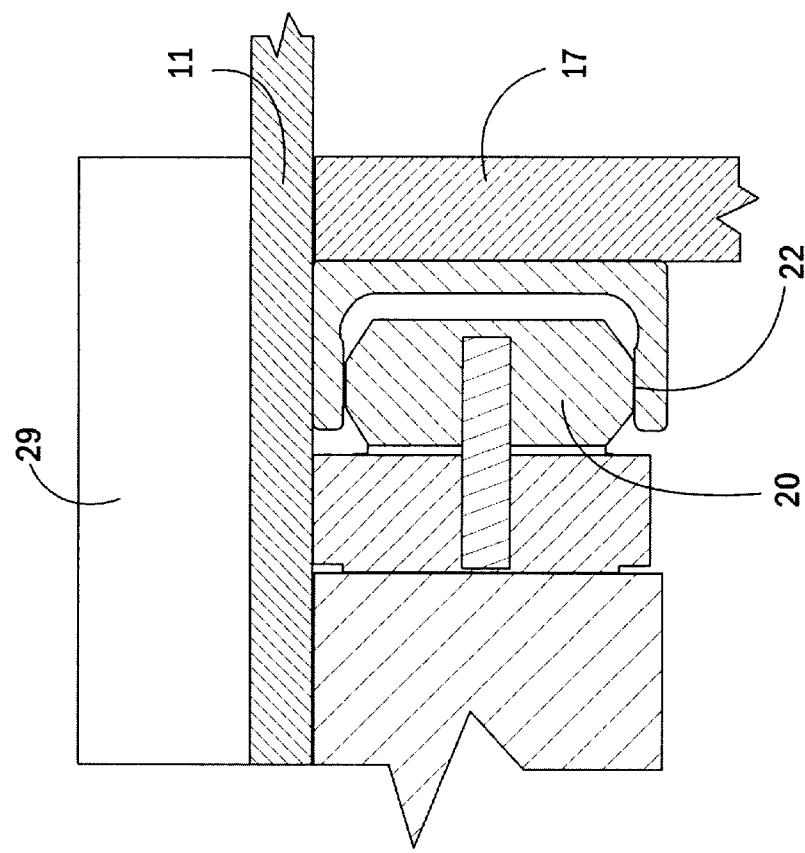
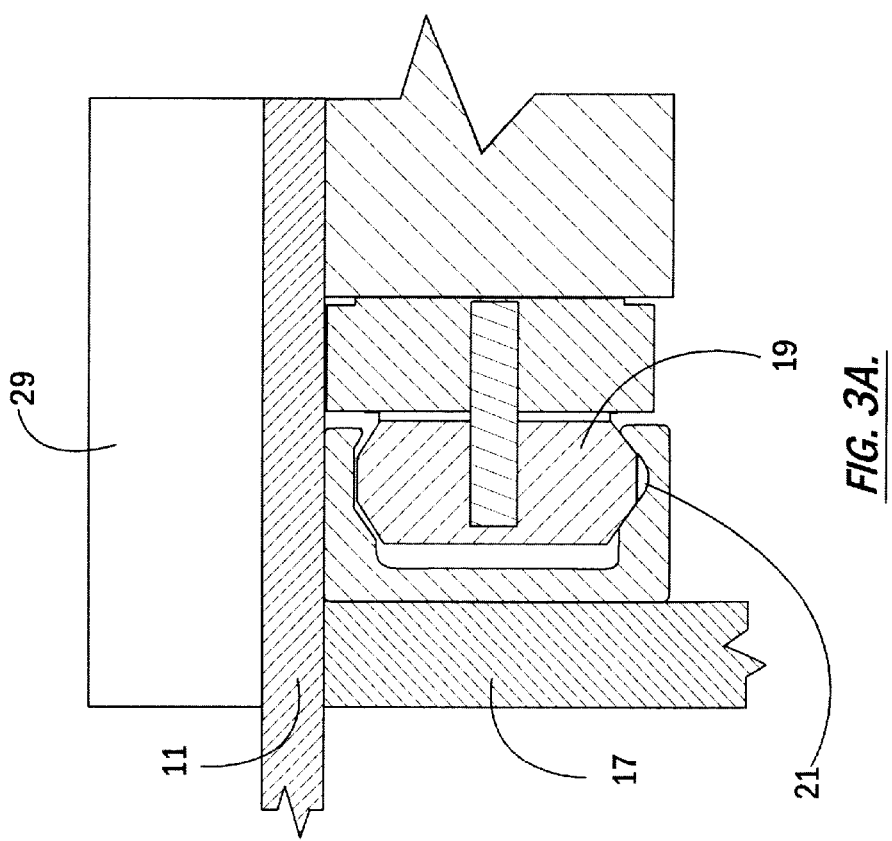
FIG. 3A.
FIG. 3B.

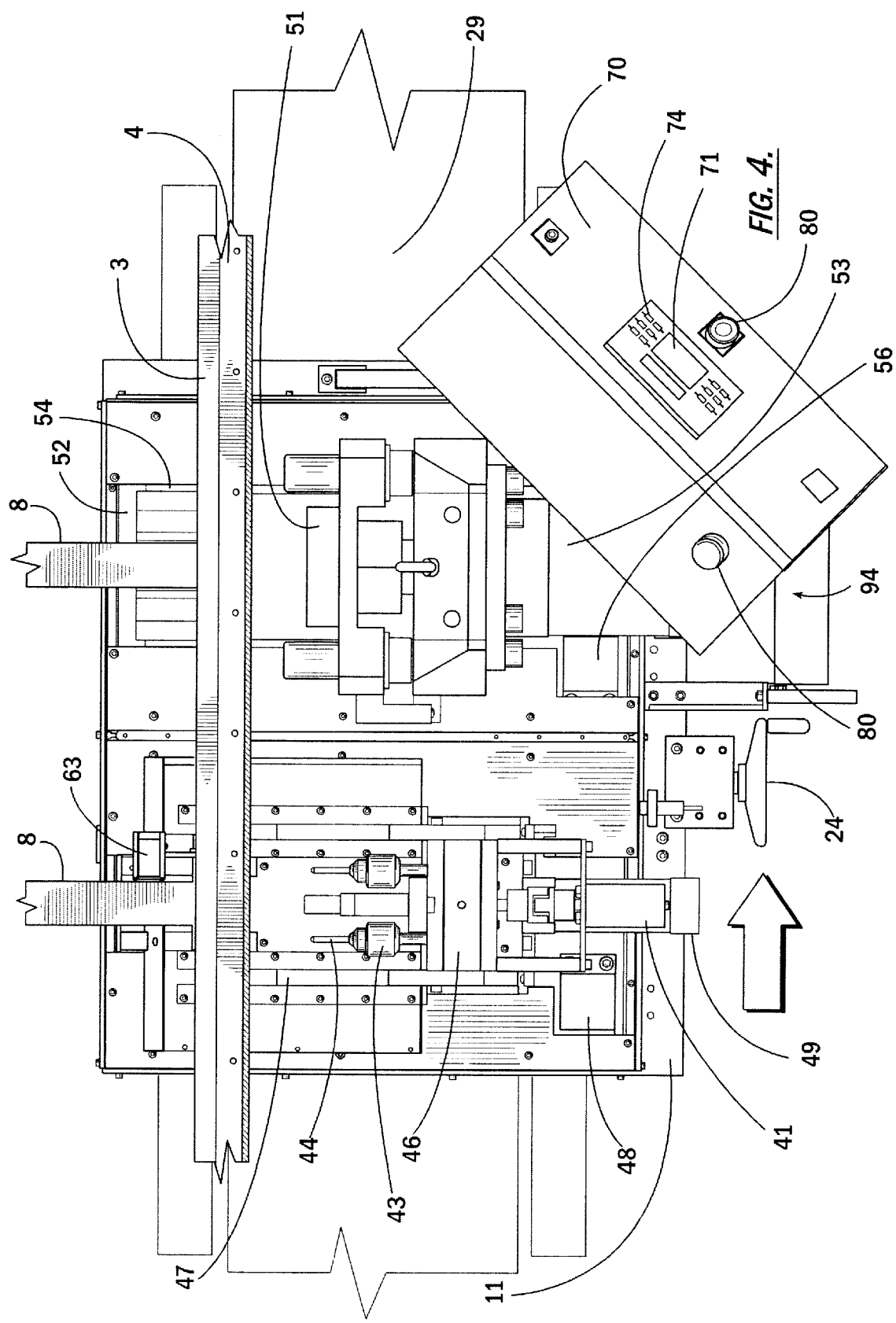

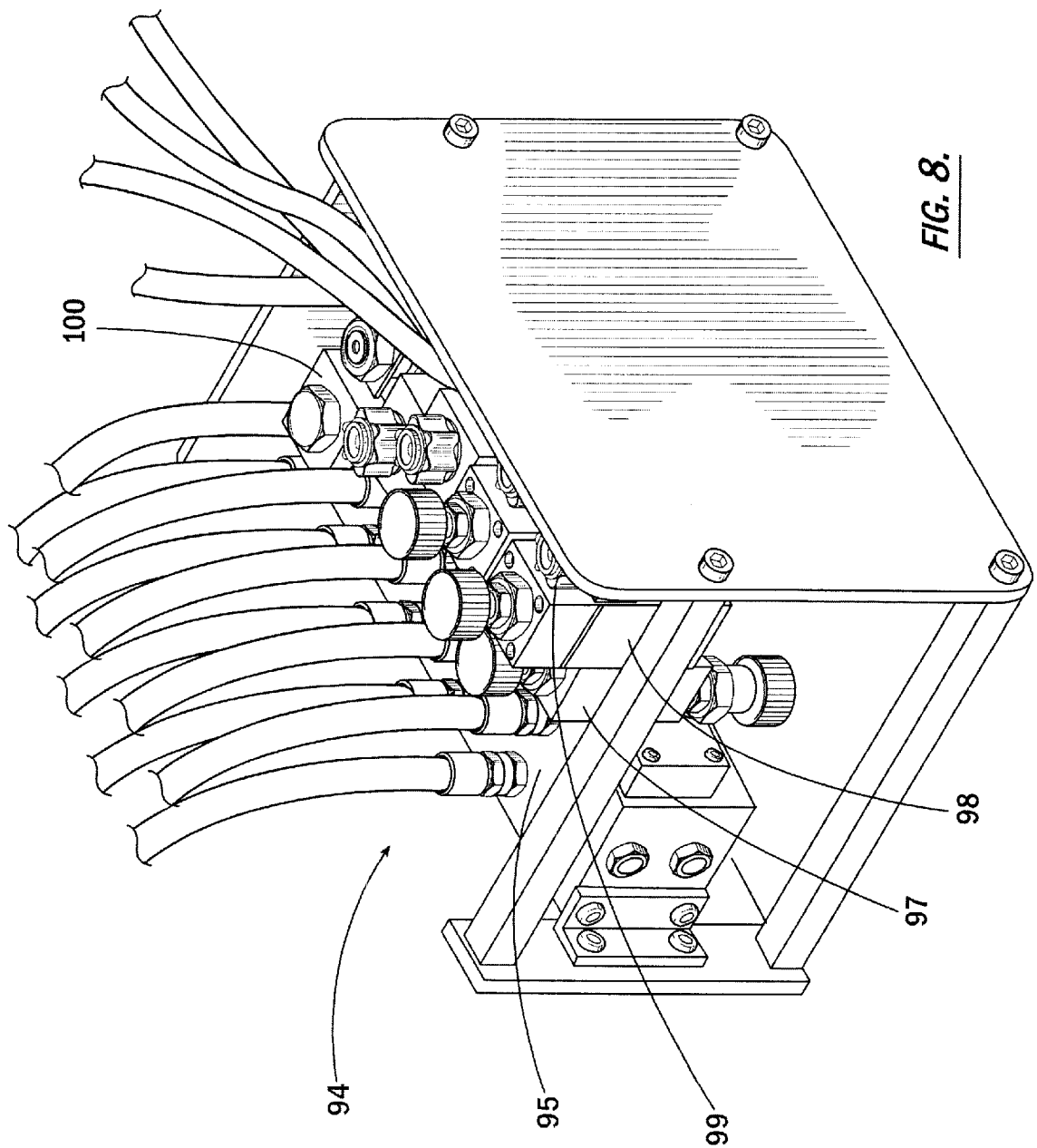

US 6,523,245 B2

AUTOMATED DRILL AND RIVET MACHINE

BACKGROUND OF THE INVENTION

The present invention relates to automatic fastening machines and methods, and, more specifically, to an apparatus and method for automatically drilling and riveting major subassemblies together.

Large objects, such as highway trailers and aircraft wings, typically comprise multiple major subassemblies fastened together. For example, a highway trailer includes major subassemblies such as a roof, side walls, and a bottom frame. The side wall may include bottom side rails that run the length of the trailer and attach to multiple cross beams that connect to the opposing bottom side rails and receive structural support from the bottom frame. During construction, the sides attach to the roof, and a crane then lowers the entire side/roof enclosure to the bottom frame for attachment at the cross beams. In the case of a 60 foot long highway trailer, the load demands and shear size of the major subassemblies require numerous points of attachment to ensure structural stability.

A wide variety of machines exist for attaching one major subassembly to another using bolts or rivets. These machines generally include a first unit to drill holes in the subassemblies, a supply of bolts or rivets, and a second unit to secure the bolts or upset the rivets in the subassemblies. Generally, the machines mount on a platform, and the platform moves relative to the subassemblies to position the machine at a desired attachment location.

In the case of large subassemblies, the rivet locations are often not uniformly spaced. For example, in the manufacture of a highway trailer, as described above, the side/roof enclosure attaches to the bottom side rails which in turn attach to the bottom frame. To increase the structural integrity of the trailer, it is preferable to attach the bottom side rails to the bottom frame coincident with the cross beams. Due to the presence of wheel axles, doorways and other design limitations, however, the cross beams are generally unevenly spaced along the length of the side rails. In addition, manufacturing tolerances result in slight variations in the distance between cross beams on each individual trailer and in the locations of cross beams on other trailers of the same general design and measurement.

SUMMARY OF THE INVENTION

The present invention recognizes and addresses disadvantages of prior art constructions and methods.

Accordingly, it is an object of the present invention to provide an automated drill and rivet machine to fasten one subassembly to another. The automated drill and rivet machine mounts on a carriage for movement relative to the subassemblies. The machine includes a drill and a masher unit movably mounted on the carriage for drilling holes and mashing rivets. The machine further includes a sensor system for detecting a work site for drilling and communicating this information to a control system. The control system communicates with the carriage, drill unit, masher unit, and sensor system to automatically direct drilling and mashing operations.

It is a further object of the present invention to provide an improved method for fastening components. A machine is provided on a carriage movable relative to the components. The machine includes a drill, a masher, a sensor, and a processor. The machine is indexed to a first work site and placed in a first mode of operation in which the processor repeatedly performs the steps of drilling at a work site, storing the location as a previous work site, sensing a next work site, and moving the drill to the next work site. An operator then inserts a rivet at the previous work site, and at a desired interval, the operator places the machine in a second mode in which the machine repeatedly performs the steps of moving the masher to a previous work site and mashing the rivets at the previous work site.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 3A is a close-up cross-sectional view of a fixed roller in the drill and rivet machine shown in FIG. 3;

FIG. 3B is close-up cross-sectional view of a floating roller in the drill and rivet machine shown in FIG. 3;

FIG. 4 is a top plan view of the drill and rivet machine shown in FIG. 1;

FIG. 8 is a perspective view of a valve station in the drill and rivet machine shown in FIG. 1;

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1:
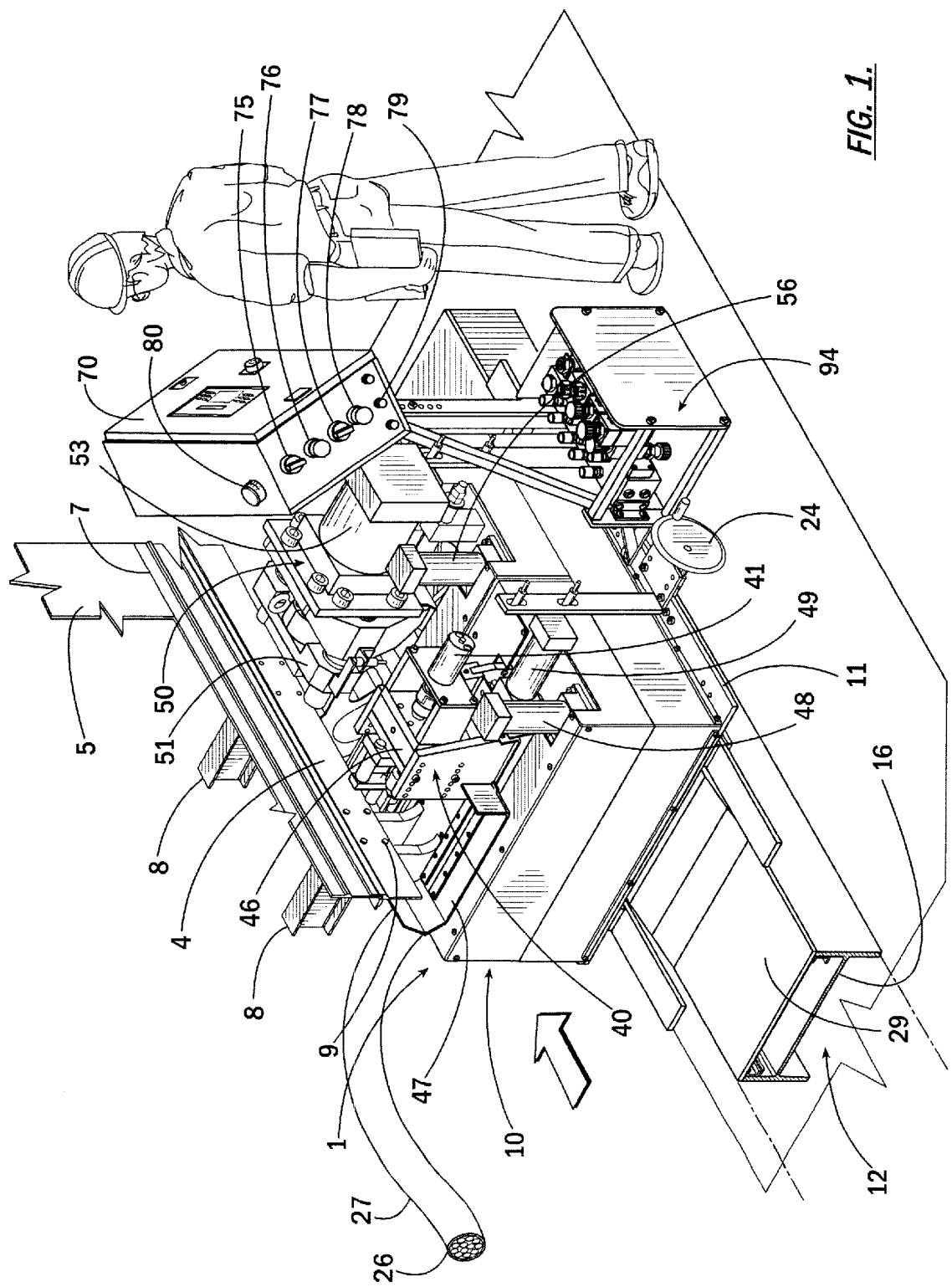
FIG. 1 is a perspective view of a drill and rivet machine according to an embodiment of the present invention.
Figure 2:
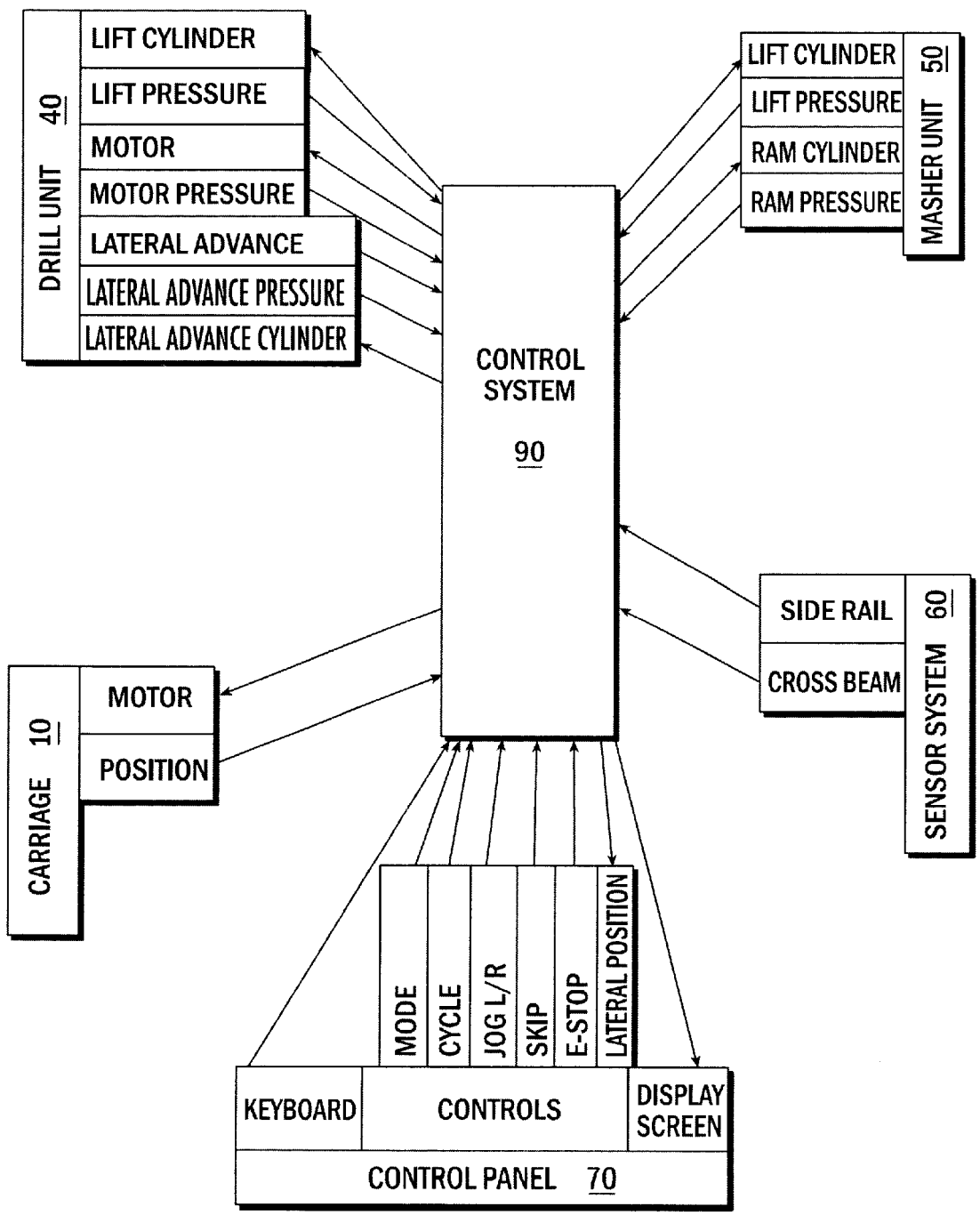
FIG. 2 is a block diagram of major components of a drill and rivet machine according to an embodiment of the present invention.

Referring to FIGS. 1 and 2, an automated drill and rivet machine 1 generally includes a carriage 10, a drill unit 40, a masher unit 50, a sensor system 60, a control panel 70, and a control system 90. Carriage 10 generally includes a platform 11 mounted on a rail system 12 on which the carriage moves laterally and adjacent to the subassemblies, here a trailer side rail 4 and bottom frame cross beams 8, to be attached to one another. Platform 11 is generally a flat piece of sheet metal sufficiently large to provide a mounting surface for the other machine components. The platform may be made of metal, aluminum, or any other material sufficiently strong and durable to support the combined weight of the other components of the automated drill and rivet machine.

Rail system 12 extends generally parallel to the length of side rail 4 to facilitate the carriage's movement with respect to the side rail. The rail system generally includes a support structure and a bearing assembly, the combination of which is sufficiently strong to transport the entire weight of the automated drill and rivet machine along the length of the side rail. For example, the rail system may be a machined track extending the length of the side rail with a bearing assembly disposed between the track and the platform to facilitate movement. Although a machined track could be manufactured to extend the entire length of the side rail, such a track may have to extend over 60 feet.

Figure 3:
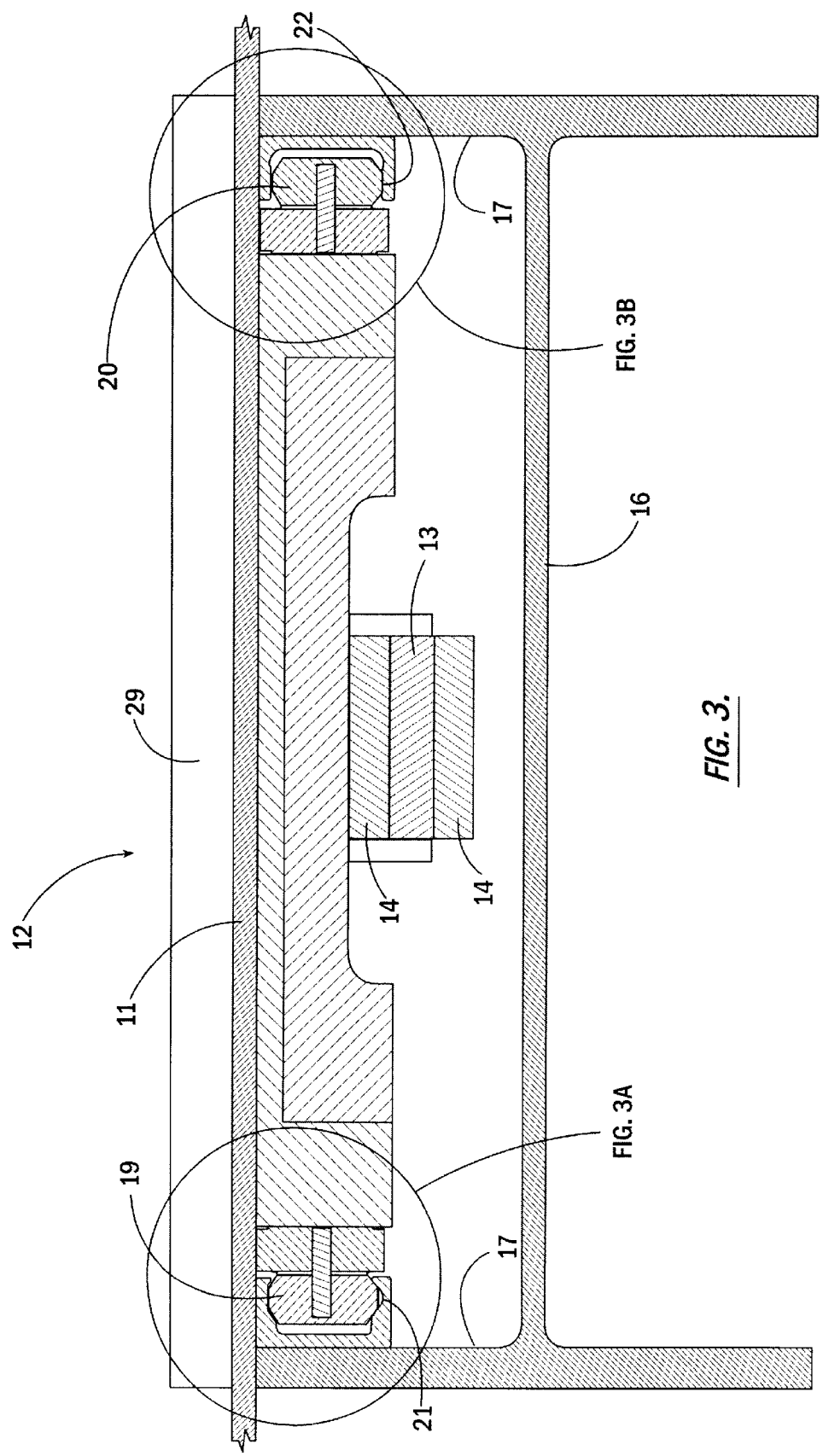
FIG. 3 is a side elevation view of a rail system for a carriage used in the drill and rivet machine shown in FIG. 1.

FIGS. 3, 3A, and 3B illustrate a less expensive embodiment of rail system 12 using an I-beam 16 in lieu of a finely machined track. As should be understood in this art, the manufacturing tolerances of an I-beam are substantially less stringent than for a machined track, and an I-beam is typically cast from iron or other durable, relatively inexpensive, commercially available metal. As a result, I-beam 16 provides a sufficiently straight structure that extends the length of side rail 4 at considerably lower cost than for a similar length of machined track.

The height and width of I-beam 16 determine the I-beam's optimum orientation. In the embodiment illustrated in FIG. 3, the I-beam lies horizontally, or on its side, with the bearing assembly attached to the I-beam's opposing vertical sides 17.

As a result of the lower manufacturing tolerances associated with I-beam construction, the separation between vertical structures 17 of the I-beam may vary several inches over the length of the major subassemblies, and the bearing assembly therefore accommodates such a variance. As illustrated in FIG. 3, the bearing assembly includes a floating roller system having a fixed roller 19 on one side and a floating roller 20 on the other side. Fixed roller 19 rides in a curved roller support 21 that has an annular groove to prevent lateral movement of the fixed roller. In contrast, floating roller 20 rides in a flat roller support 22 that allows the floating roller to slide laterally in the roller support as the distance between vertical structures 17 varies over the length of I-beam 16.

Various suitable mechanical devices may be used to move the carriage on the rail system along the side rail. In one preferred embodiment, for example, a pulley 13 mounted on the underside of carriage 10 connects to a small electric motor (not shown) at a distal end of the rail system by way of a belt 14 to move the carriage along the rail system adjacent to the side rail. Similarly, a screw, jack, scissors, piston, or similar device can be used to advance the carriage in the desired direction on the rail system. The term "drive" as used herein means any such mechanism. A servo-motor (not shown) is coupled to either the motor or the pulley to measure linear travel of the carriage with respect to the side rail and transmit this information to control system 90.

Referring to FIGS. 4, 5, 6, and 7, a lateral hand wheel 24 connects to a threaded shaft 25. Rotation of lateral hand wheel 24 threadedly drives shaft 25 to move the carriage laterally on the rail system, allowing the operator to manually adjust the lateral position of the carriage with respect to the side rail. Depending on the design needs and mode of operation, an operator may manually control the movement of the carriage through control system 90, or the control system may automatically control the movement of the carriage without any further operator input.

Rail system 12 may also include a cable run 26 and an associated cable guard 27, as illustrated in FIG. 1 only. Cable run 26 is comprised of cable bundles that provide electric, hydraulic, or pneumatic power to the machine, depending on the power needs of the particular design. As a result, cable run 26 is preferably capable of moving with the machine over the entire length of the subassemblies without fouling or creating a work hazard. Accordingly, cable guard 27 surrounds cable run 26 in the vicinity of carriage 10 to protect the cables from interference.

A way cover 29, shown in FIGS. 1 and 3, is disposed between platform 11 and the remainder of the carriage. The way cover is typically made of light sheet metal or aluminum and generally provides a flat, flexible surface over the bearing assembly. As the carriage moves along the rail system, the way cover slides over the platform and shields the bearing assembly from drill shavings, burrs, or other objects.

Referring to FIGS. 1, 4, 5, and 6, drill unit 40 generally includes a motor 41, a gear, four drill chucks 43 arranged in a square formation, four respective drill bits 44, and a backing plate 45. In the illustrated embodiment, motor 41 is hydraulically powered to produce rotational force to the gear, although pneumatic and electric motors are also well known in the art and may be used within the present system. The gear transmits rotational force from motor 41 to drill chucks 43 and drill bits 44. The gear may comprise a synchronous gear 46, for example a four-headed gear box made and sold by McKee Engineering, through which motor 41 rotationally drives four drill chucks 43.

Backing plate 45 slideably connects to drill unit 40 by a C-frame 47. Backing plate 45 sits behind side rail 4 and provides lateral support to the side rail during drilling. The backing plate is generally U-shaped with an upward opening that receives a cross beam so that the backing plate brackets the cross beam.

Drill unit 40 operably mounts on platform 11 for vertical and lateral movement. Various suitable mechanical devices may be used to move the drill unit in the desired direction, for example a screw, jack, scissors, piston, or similar device. In the embodiment illustrated, a drill lift cylinder 48 and a lateral advance cylinder 49 move the drill unit vertically and laterally, respectively. Each cylinder may include a linear transducer and associated wiring, not shown, for measuring movement and transmitting movement information to the control system for use in operation. Lateral advance cylinder 49 attaches to C-frame 47 so that actuation of the cylinder initially draws backing plate 45 toward the back of side rail 4. When the backing plate abuts the back of the side rail, further actuation of the lateral advance cylinder moves the drill unit laterally on the carriage toward the front of the side rail. Drill lift cylinder 48 and lateral advance cylinder 49 operate by hydraulic pressure, although electric and pneumatic cylinders are also suitable.

Referring to FIGS. 1, 4, 6, and 7, masher unit 50 generally includes a buck plate 51, an upset plate 52, and a ram 53. The buck plate attaches to the piston end of the ram, and the ram slideably connects to the upset plate by a C-frame 54. As a result, the buck plate and upset plate 52 slideably oppose each other on opposite sides of side rail 4. Actuation of the ram initially drives the buck plate toward the front of the side rail. When the buck plate abuts the front of the side rail, further actuation of the ram draws the upset plate on the C-frame toward the back of the side rail. Ram 53 may be any suitable device capable of generating sufficient mechanical advantage to mechanically deform installed rivets by compression between the buck plate and the upset plate. In one embodiment, the ram includes a hydraulic piston, but a screw, jack, scissors, pneumatic piston or other suitable structure could also be used.

Masher unit 50 operably mounts on platform 11 for vertical movement. In the present embodiment, a masher lift cylinder 56 moves masher unit 50 vertically on the platform. Various mechanical devices, for example a screw, jack, scissors, electric or pneumatic piston, or similar device can be used to raise or lower the masher unit. In the present embodiment, masher lift cylinder 56 operates by hydraulic pressure and may include a linear transducer and associated wiring, not shown, for measuring movement and transmitting movement measurements to the control system for use in operation.

Figure 9A:
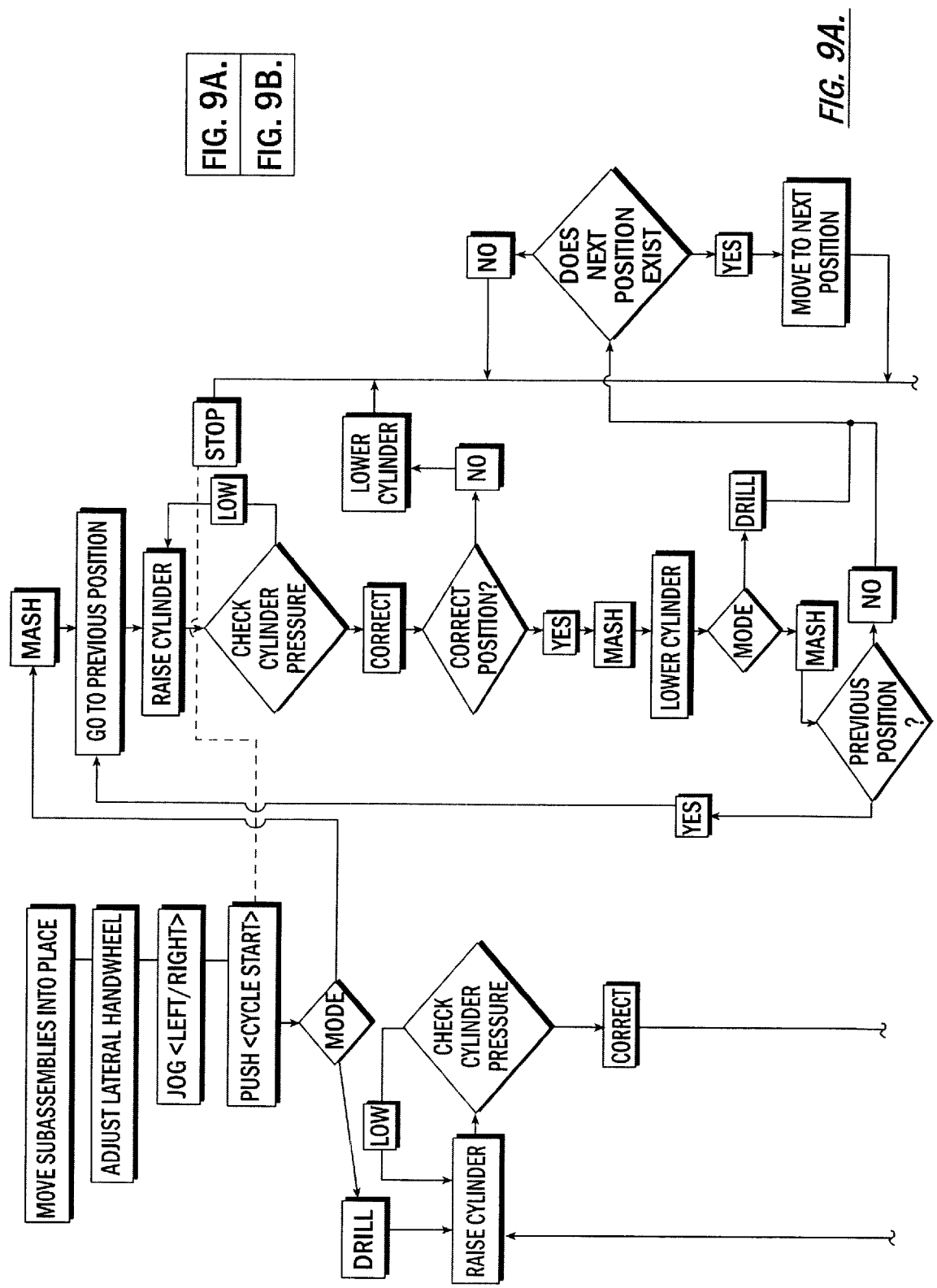
FIG. 9 is a flow diagram for a control system of the drill and rivet machine shown in FIG. 1.
Figures 9A, 9B:
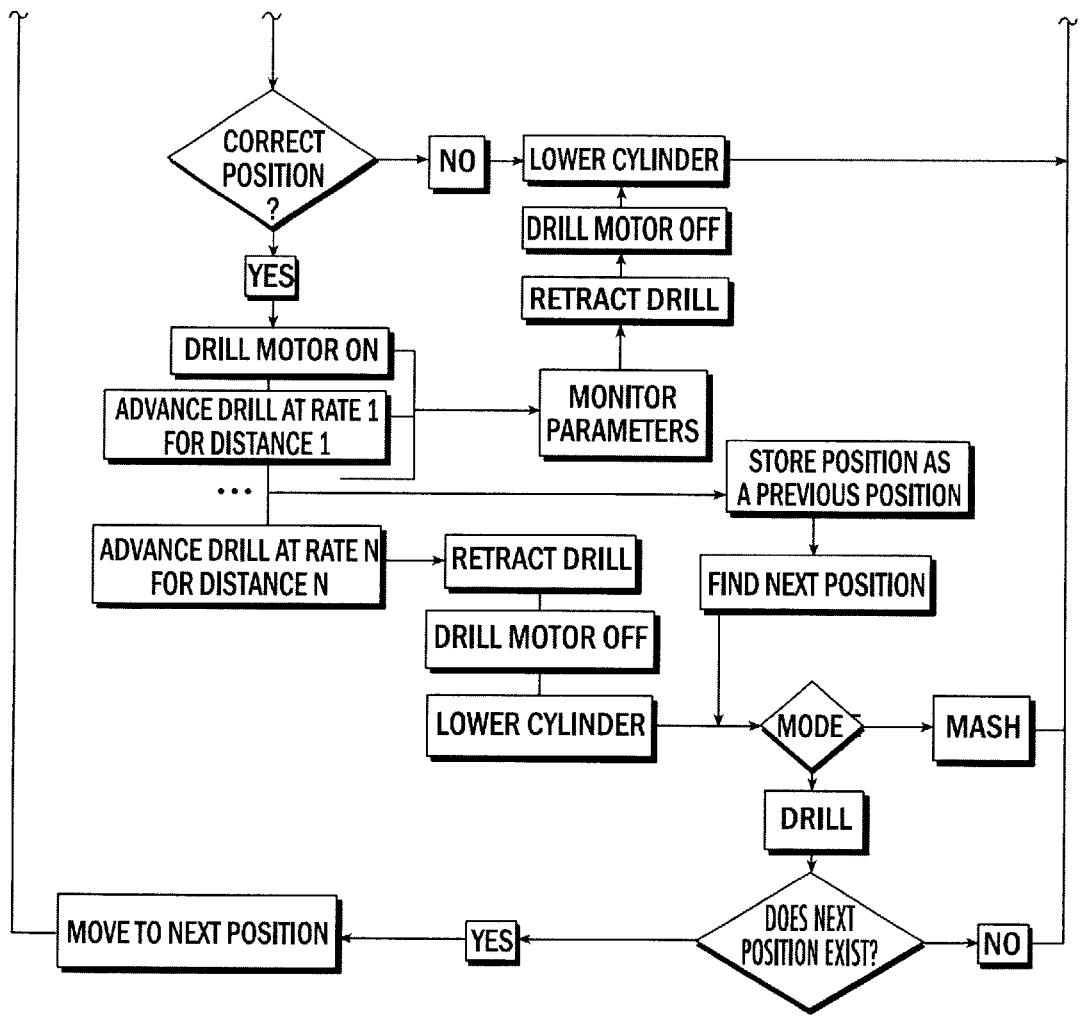

Referring to FIGS. 2, 9A, and 9B, sensor system 60 determines the position of carriage 10 with respect to side rail 4 and communicates this information to control system 90. Sensor system 60 generally includes one or more laser sensors strategically located on carriage 10 that communicate with control system 90 through cables. The sensors can be optical, infrared, sonic, electromagnetic, or other suitable commercially available detectors that communicate with the control system by suitable methods such as hard wiring, optical relays, infrared signals or some combination thereof.

The number and location of the sensors in a given embodiment of a drill and rivet machine according to the present invention will depend on the nature of the subassemblies being attached and the task for which the machine is designed. In the present example, as shown in FIG. 1, the machine rivets side rails 4 of a side/roof enclosure (shown in part at 7) of a van type trailer to cross beams 8 of the bottom frame. As previously described, the preferred rivet positions are the points where the cross beams meet the side rails. Therefore, the sensor system in this embodiment should be capable of locating both the side rails and the cross beams.

Figure 6:
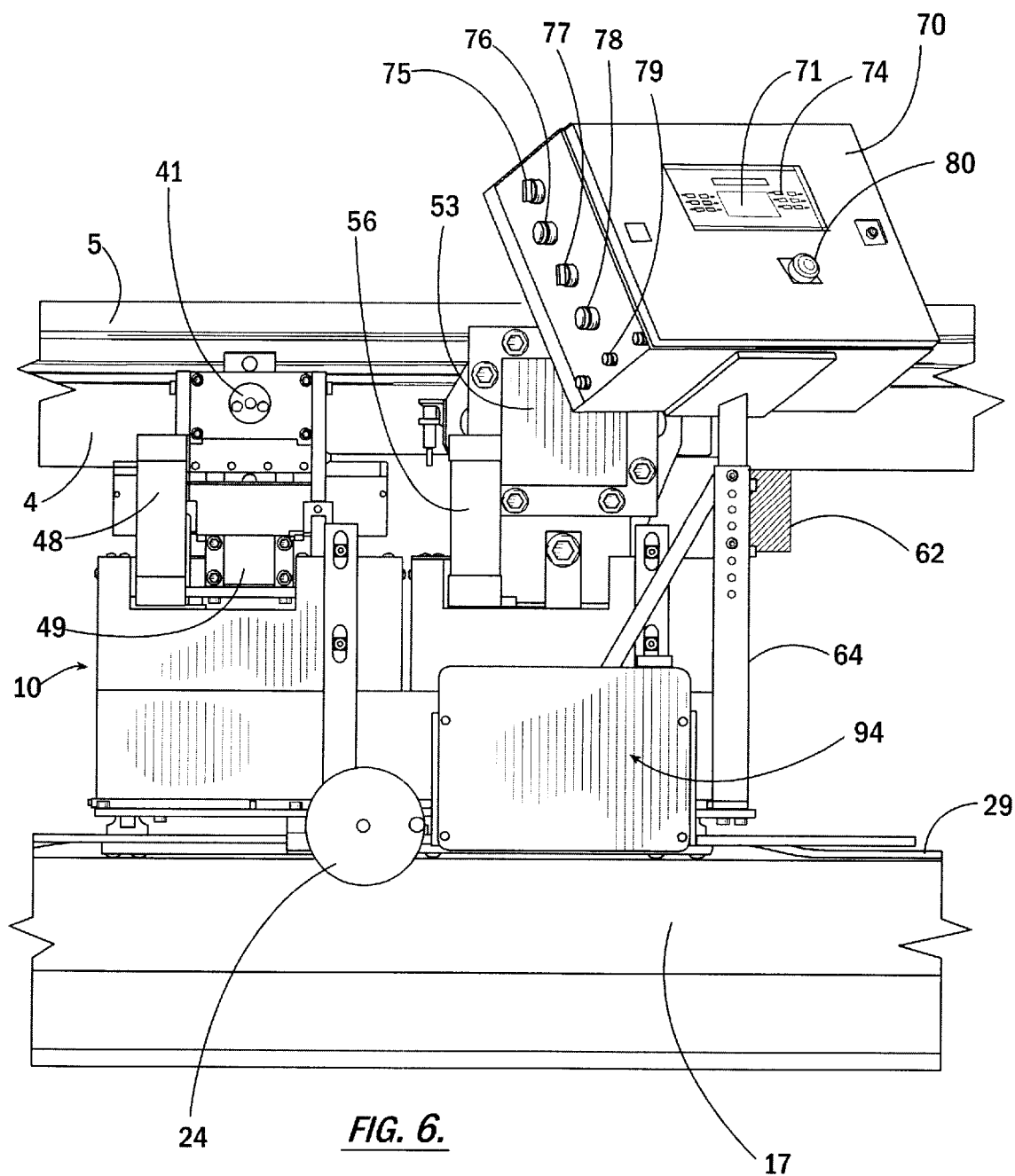
FIG. 6 is a front elevation view of the drill and rivet machine shown in FIG. 1.
Figure 7:
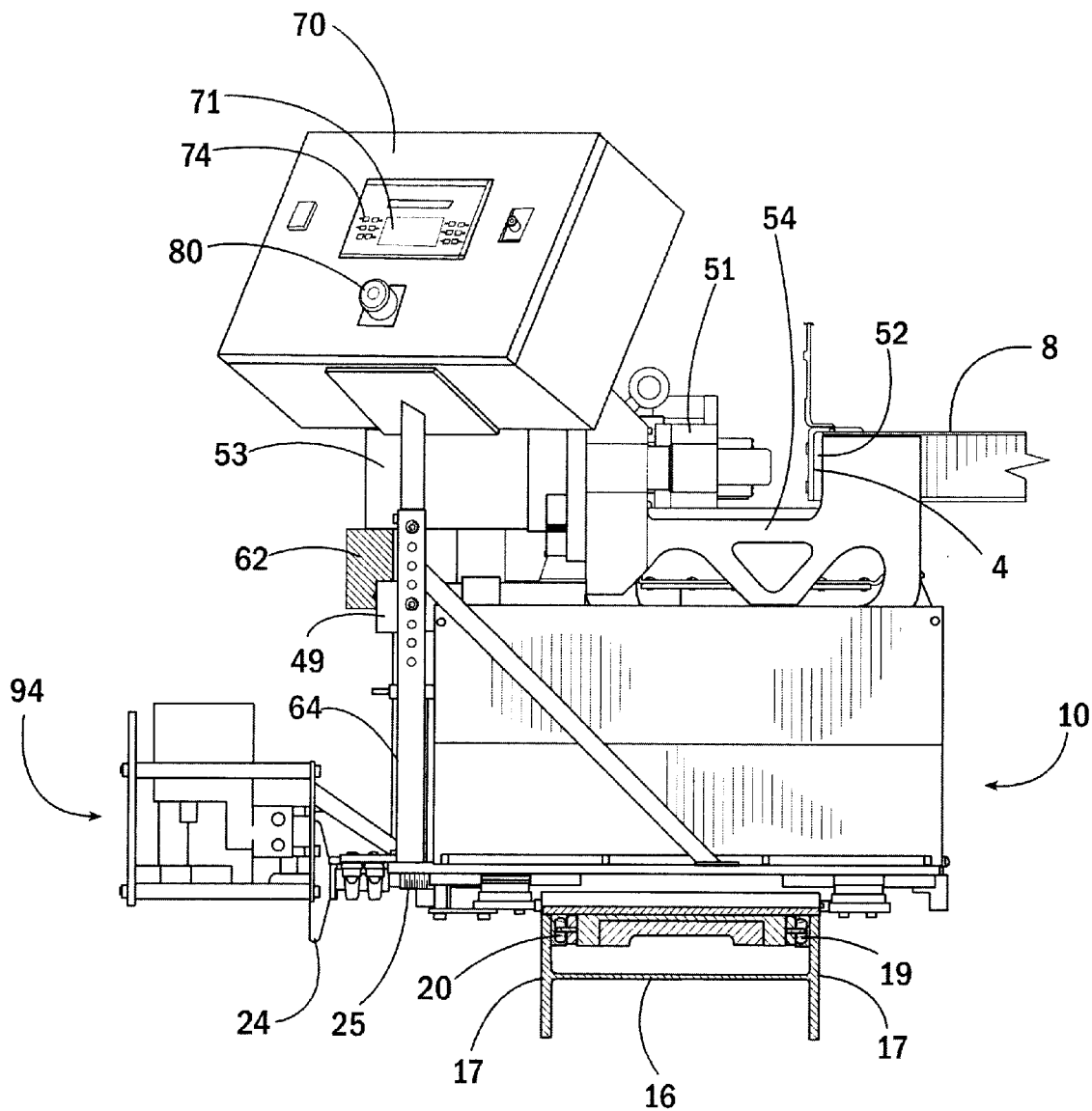
FIG. 7 is a side elevation view of the drill and rivet machine shown in FIG. 1.

Accordingly, and referring to FIGS. 6 and 7, a side rail laser sensor 62 mounts on a stanchion 64 supporting control panel 70 so that the side rail sensor has a direct and uninterrupted line of sight to the side rail. The sensor transmits a beam to the side rail and computes the distance to the side rail based on the angle of the beam reflected back to the sensor. Thus, side rail sensor 62 can readily detect the presence of, and distance to, the side rail.

A cross beam sensor 63 (FIG. 4) mounts on backing plate 45 so that it has a direct line of sight to the cross beams without interfering in the movement of the carriage. This mounting location allows the cross beam sensor to detect and measure the distance to the next cross beam in a similar manner as with the side rail sensor.

Referring again to FIG. 1, control panel 70 fixedly mounts on carriage 10 to provide the operator convenient access during operation. The control panel generally includes a display screen 71, a keyboard 74, and various controls to allow the operator to communicate with control system 90 (FIG. 2). Display screen 71 is an LCD screen providing a graphic or visual display of system operating conditions. The control panel may include an LED or other visual display or audio display. The keyboard includes a touch pad for changing displays and providing input to control system 90.

Figure 5:
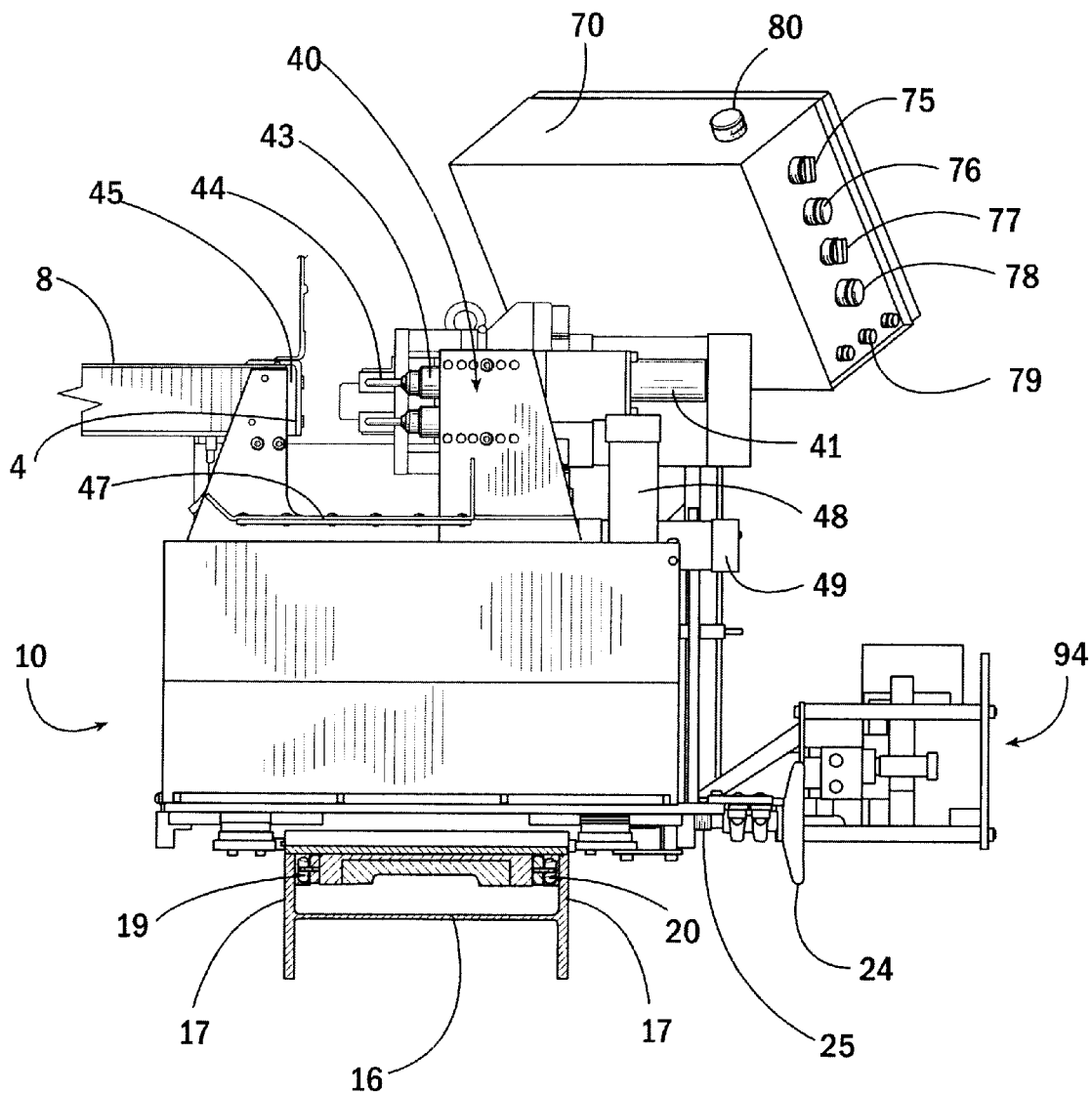
FIG. 5 is a side elevation view of the drill and rivet machine shown in FIG. 1.

Referring to FIGS. 5 and 6, a mode selector switch 75 allows the operator to select between a "drill" mode, in which drill unit 40 drills holes to receive rivets, and a "mash" mode, in which masher unit 50 mashes rivets placed in the drilled holes. A cycle start button 76 places the machine in automatic operation to perform a cycle of the selected mode, i.e., drilling or mashing. A jog switch 77 allows the operator to manually move carriage 10 longitudinally on rail system 12 so that the machine is in the proper position to begin a cycle. A skip button 78 allows the operator to manually interrupt the automated process and cause the control system to skip the drill or mash operation that would otherwise occur at the next location. A set of three lateral position lights 79 operate in conjunction with side rail sensor 62 to indicate if carriage 10 is too close, too far, or correctly spaced from side rail 4. An emergency stop button 80 interrupts all signals from control system 90, thereby stopping all operations.

Control system 90 (FIG. 2) receives signals from the touch pad, function buttons, carriage servo-motor, various cylinder linear transducers, and sensors, processes those signals, and directs the movement and operation of the automated drill and rivet machine responsively to information carried by the signals. The control system generally includes a central processing unit (CPU), memory, and associated software. The CPU, memory, and other associated electric devices may comprise commercially available components mounted on a circuit board housed within control panel 70. The memory and/or CPU store the software. Those skilled in the art should understand the construction of appropriate circuitry and software, for example written in Ladder Logic or other suitable language, to execute the functions described herein.

The control system directs the movement and operation of the automated drill and rivet machine through control signals sent to its various components. For some components, such as the display screen and the carriage motor, the control system sends the signal directly to the component. The control system directs control signals for other components, such as the drill unit and masher unit, through a valve station 94, such as shown in detail in FIG. 8. Valve station 94 generally includes a valve manifold 95 through which hydraulic fluid passes to control a valve stack that, in turn, drives each hydraulically powered component. Although a "valve stack" as used herein may refer to various arrangements according to the particular hydraulic needs of the given components, each valve stack in the illustrated embodiment includes a flow control valve 97, a pressure reducing valve 98, and a directional valve 99. The valve stack for lateral advance cylinder 49 (FIG. 1) additionally includes a proportional valve 100 for accurately varying the rate at which drill unit 40 advances while drilling through subassemblies of varying hardness. For example, the operator may pre-program control system 90 to advance drill unit 40 at a rate that is inversely proportional to the subassembly's hardness, thus extending the useful life of the drill bits and generally improving drilling efficiency.

In operation, and referring again to FIG. 1, the presently illustrated example of automated drill and rivet machine 1 is designed to rivet side rails 4 of a side/roof enclosure of a van type trailer to cross beams 8 in the trailer's bottom frame 3. In general, the machine repeatedly drills holes, locates the next cross beam, moves the drill unit on the carriage to the next cross beam, and drills the next set of holes. An operator manually inserts rivets in the drilled holes. At desired intervals, or when the machine detects that it has reached the end of the side rail, the operator changes the machine to mash mode. The machine then moves back along the track, places the masher unit on the carriage at the positions adjacent to the cross beams at which the drill unit previously drilled the holes, and mashes the installed rivets, repeating the process until all rivets have been mashed.

Referring to FIGS. 1, 2, 5, 6, 9A, and 9B, the operator first positions the side/roof enclosure so that the side rail is in an appropriate position adjacent to the cross beams. Machine 1 is in position on rail system 12 so that side rail sensor 62 is level with the side rail's expected position and so that the side rail is roughly between and above drill bits 44 and backing plate 45. The side rail sensor then measures the distance to the side rail and communicates the measured distance to control system 90. The control system compares the measured distance with previously stored distances corresponding to the end of the drill bits and to the backing plate and actuates the appropriate lateral position light 79 to indicate if the carriage is too far, too close, or properly positioned laterally with respect to the side rail. The operator then manually rotates lateral hand wheel 24, as necessary, to move the carriage laterally in the appropriate direction until the center lateral position light activates, indicating that the carriage is the correct distance from the side rail such that the side rail is above the opening between the drill bits and the backing plate.

The operator then manually positions the carriage longitudinally along rail system 12 to a proposed rivet location (i.e., the operator aligns the drill unit directly beneath a cross beam). Toggling jog switch 77 clockwise moves the carriage to the right, while counter-clockwise rotation moves the carriage to the left. The jog switch sends a signal to the control system, and the control system relays the signal to the carriage motor to move the carriage in the desired direction. As previously described, a servo-motor, or suitable substitute, coupled to the carriage motor continuously measures movement along the rail system and transmits this information to the control system for later use during mashing operations. When the carriage is at the proposed rivet location, the operator rotates mode selector switch 75 to "drill" and pushes cycle start button 76, thus placing the control system in automatic operation.

Upon activation of the cycle start button, the control system receives the "drill" signal from mode selector switch 75 and begins the automated drilling sequence. The control system first actuates drill lift cylinder 48 to raise drill unit 40. As the drill lift cylinder raises the drill unit, the control system monitors pressure in the cylinder. When the pressure reaches a pre-set maximum, indicating either that the drill lift cylinder is fully extended or the drill unit abuts the bottom of the side rail, the control system stops the drill lift cylinder to hold the drill unit's vertical position.

The control system then determines if the drill unit is in proper position to drill through the side rail into the end plate of a cross beam. The control system compares the signal from the lift cylinder's linear transducer to a predetermined value stored in memory that corresponds to what the signal should be at the side rail's known height. If the drill unit is not at the proper height, the control system sends a signal to retract the drill lift cylinder and lower the drill unit. The control system then stops the automated drilling sequence, and the operator manually aligns the drill unit with a cross beam and pushes cycle start button 76 to resume the automated drilling sequence.

If the drill unit is properly positioned, the control system actuates lateral advance cylinder 49 and drill motor 41. Actuation of the lateral advance cylinder draws the backing plate toward the back of the side rail. When the backing plate abuts the back of the side rail at the cross beam's end plate, continued actuation of the lateral advance cylinder moves the drill unit laterally on the carriage toward the front of the side rail, causing the rotating drill bits to bore into the side rail.

Simultaneously, control system 90 monitors and records various operating parameters, such as motor pressure, lateral advance cylinder pressure, and lateral advance distance, to control the lateral advance rate of the drill unit according to pre-programmed values. This allows the drilling to proceed at the desired rate, depending on the material used for the side rail and cross beams. In addition, monitoring operating parameters provides an early indication of component problems and aids in scheduling preventive and corrective maintenance. As shown in FIG. 9, the operator can program the control system to stop the automated drilling sequence if an operating parameter exceeds a predetermined threshold. For example, excessive lateral advance cylinder pressure may indicate that the drill bits are worn and require replacement.

As the control system directs the drilling, cross beam sensor 63 (FIG. 4) simultaneously determines the distance to the next cross beam and sends this information to the control system. The control system stores the current position of the carriage (as indicated by the servo-motor connected to the carriage motor) for later use during the automated mashing sequence and processes the information from the cross beam sensor to establish the next rivet location.

When the linear transducer in the lateral advance cylinder indicates that the drill bits have advanced through the bottom rail and cross beam end plate, the control system retracts the lateral advance cylinder. This relaxes the backing plate pressure against the back of the cross beam plate and retracts the drill unit and rotating drill bits from the side rail. When the drill unit is fully retracted, the control system stops the drill motor and retracts the drill lift cylinder to lower the drill unit so that the backing plate clears the cross beam. The control system then checks the position of the mode selector switch and the output of the cross beam sensor. If the mode selector switch is not selected to "drill", or if the cross beam sensor indicates that a next rivet location does not exist, the control system stops the automated drilling sequence. Otherwise, the control system actuates the carriage motor to move the carriage until the servo-motor indicates that the carriage is at the next rivet location. With the drill unit beneath the next cross beam, the automated drilling sequence repeats at the next rivet location.

As the automated drilling sequence continues, the operator inserts rivets into the newly drilled holes. At any point, the operator can elect to mash the rivets previously inserted by rotating mode selector switch 75 to "mash." If the control system is directing an automated drilling sequence, the sequence continues until the drill unit next returns to a retracted and lowered position. At that point, the control system receives a "mash" signal from the mode selector switch and stops the automated drilling sequence. The operator must then push cycle start button 76 to begin the automated mashing sequence.

In the automated mashing sequence, the control system actuates the carriage motor in the reverse direction to align the masher unit beneath the most recently drilled rivet location. The control system determines the distance needed to move the carriage by retrieving the position of the most recent drilling operation and adjusting that distance by the predetermined offset between the drill unit and masher unit on the carriage.

Once the masher unit is aligned under the most recently drilled rivet location, the control system actuates masher lift cylinder 56 to raise masher unit 50. As the masher lift cylinder raises the masher unit, the control system monitors pressure in the cylinder. When the pressure reaches a pre-set maximum, indicating either that the masher lift cylinder is fully extended or that the masher unit abuts the bottom of the side rail, the control system stops the masher lift cylinder to hold the vertical position of the masher unit.

The control system then determines if the masher unit is in proper position to mash the previously installed rivets. The control system compares the signal from the masher lift cylinder's linear transducer to a predetermined value stored in memory that corresponds to what the signal should be at the side rail's known height. If the masher unit is not at the proper height, the control system sends a signal to retract the masher lift cylinder and lower the masher unit. The control system then stops the automated mashing sequence, and the operator manually aligns the masher unit with a rivet location and pushes the cycle start button to resume the automated mashing sequence.

If the masher unit is properly positioned, the control system actuates ram cylinder 53 to advance buck plate 51 toward the rivet heads installed in the side rail. When the buck plate abuts the rivet heads and can advance no further, continued actuation of the ram cylinder draws upset plate 52 against the back of the cross beam end plate to deform the portion of the rivets extending through the end plate. As the ram cylinder mashes the rivets, the control system monitors the ram cylinder pressure. When the ram cylinder pressure reaches a pre-set maximum, the control system retracts the ram cylinder to simultaneously move the buck plate and the upset plate away from the side rail. When the ram cylinder has fully retracted, the control system retracts the masher lift cylinder to lower the masher unit so that C-frame 54 clears the cross beam. The control system then checks the position of the mode selector switch and determines if another previously drilled rivet location exists. If the mode selector switch is not selected to "mash" or if another previously drilled rivet location does not exist, the control system actuates the carriage motor to move the carriage to the next drilling location so that the drill unit is beneath the next cross beam to be drilled, and the control system stops the automated mashing sequence. Otherwise, the control system actuates the carriage motor to move the masher unit beneath the next most recently drilled rivet location, and the automated mashing sequence repeats.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the literal and equivalent scope of the appended claims.

What is claimed is:

1. An automated drill and rivet machine for riveting a work piece at sequential work sites on the work piece, said machine comprising:

a carriage disposed proximate to the work piece for movement relative thereto;

a drill movably mounted on said carriage;

a masher movably mounted on said carriage proximate to said drill;

a first sensor disposed on said carriage so that when said carriage is proximate to a first work site, said first sensor detects a second work site;

a drive in communication with said carriage for moving said carriage with respect to the work piece;

a control system in operative communication with said carriage, said drill, said masher, said drive, and said first sensor, said control system having a processor operable in a first mode and a second mode, wherein in said first mode said processor drives said drill at said first work site to drill one or more holes in the work piece, wherein in said second mode said processor drives said masher at said first work site to secure rivets in said one or more holes, and wherein, in either of said first mode or said second mode following operation of said drill or said masher, respectively, said control system moves said carriage to said second work site responsively to said first sensor.

2. The automated drill and rivet machine as in claim 1, wherein said carriage includes a threaded screw for movement relative to the work piece.

3. The automated drill and rivet machine as in claim 1, wherein said carriage includes wheels and an electric motor in driving communication with said wheels for movement relative to the work piece.

4. The automated drill and rivet machine as in claim 1, wherein said machine includes a track substantially parallel to the work piece for movement of said machine adjacent to the work piece.

5. The automated drill and rivet machine as in claim 4, wherein said carriage includes a floating bearing assembly in contact with said track for moving said machine along said track, wherein said bearing assembly has a fixed bearing on a first side and a floating bearing on a second side.

6. The automated drill and rivet machine as in claim 1, wherein said drill includes a motor operably connected to a chuck holding a drill bit.

7. The automated drill and rivet machine as in claim 1, wherein said masher includes a buck plate, a mash plate slideably opposed to said buck plate, and a ram operably connected to said buck plate and said mash plate for moving said buck plate with respect to said mash plate.

8. The automated drill and rivet machine as in claim 1, wherein said first sensor includes a laser sensor.

9. The automated drill and rivet machine as in claim 1, wherein said first sensor is configured to determine a relative distance between said carriage and said second work site.

10. The automated drill and rivet machine as in claim 1, wherein said processor in said first mode directs said drill at a variable rate.

11. The automated drill and rivet machine as in claim 1, including a second sensor disposed on said carriage so that said second sensor detects the work piece when the work piece is in a desired work position with respect to said carriage and wherein said control system is configured, in either said first mode or said second mode, to move said drill or said masher, respectively, into an operative position with respect to said first work site and said second work site responsively to said second sensor.

12. The automated drill and rivet machine as in claim 11, wherein said second sensor includes a laser sensor.

13. The automated drill and rivet machine as in claim 11, including respective hydraulic drives disposed on said carriage in operative communication with said drill and said masher, each of said hydraulic drives being in operative communication with said processor for moving said drill and said masher with respect to the work piece, and wherein said second sensor includes respective linear transducers in said hydraulic drives.

14. The automated drill and rivet machine as in claim 11, wherein said second sensor is separate from said first sensor.

15. The automated drill and rivet machine as in claim 11, wherein said second sensor is configured to determine a relative distance between said carriage and the work piece.

16. The automated drill and rivet machine as in claim 1, including a second sensor in communication with said processor, wherein said second sensor is configured to detect one or more distances said carriage travels with respect to said work sites and wherein said processor determines and stores positions of said work sites with respect to said carriage responsively to said second sensor.

17. The automated drill and rivet machine as in claim 16, wherein, after completing operation in said first mode and being switched to said second mode, said control system is configured to move said masher to said work sites responsively to said one or more stored distances.

18. The automated drill and rivet machine as in claim 16, wherein said second sensor includes a servo motor.

19. An automated drill and rivet machine for attaching a first subassembly to a second subassembly at sequential positions on the first and second subassemblies, where at least one of the subassemblies includes a predetermined structural feature, said machine comprising:
    a carriage movable with respect to said first and second subassemblies sequentially to said sequential positions;
    a drill operably mounted to said carriage;
    a rivet masher operably mounted to said carriage proximate to said drill;
    a sensor operably mounted to said carriage so that, at a first position, said sensor detects said feature at a next sequential position and outputs a measurement signal responsively thereto; and
    a control system, including a processor, in operative communication with said sensor, said carriage, said drill, and said rivet masher,
    wherein said control system receives said measurement signal from said sensor,
    wherein said processor is configured to determine a relative position between said first position and said next sequential position, and
    wherein said control system is configured to move said carriage to said next sequential position responsively to said relative position determined by said processor and to operate said drill and said rivet masher at said next sequential position.

20. The automated drill and rivet machine as in claim 19, wherein said carriage includes a threaded screw for movement with respect to said first and second subassemblies.

21. The automated drill and rivet machine as in claim 19, wherein said carriage includes wheels and an electric motor in driving communication with said wheels for movement with respect to said first and second subassemblies.

22. The automated drill and rivet machine as in claim 19, wherein said machine includes a track substantially parallel to said first and second subassemblies for movement of said machine adjacent to said subassemblies.

23. The automated drill and rivet machine as in claim 22, wherein said carriage includes a floating bearing assembly in contact with said track for moving said machine along said track, wherein said bearing assembly has a fixed bearing on a first side and a floating bearing on a second side.

24. The automated drill and rivet machine as in claim 19, wherein said drill includes a motor operably connected to a chuck holding a drill bit.

25. The automated drill and rivet machine as in claim 19, wherein said rivet masher includes a buck plate, a mash plate slideably opposed to said buck plate, and a ram operably connected to said buck plate and said mash plate for moving said buck plate with respect to said mash plate.

26. The automated drill and rivet machine as in claim 19, wherein said sensor includes a laser sensor.

27. The automated drill and rivet machine as in claim 19, wherein said control system operates said drill at a variable rate.

28. An automated drill and rivet machine for riveting a work piece, said machine comprising:
    a carriage for movement relative to the work piece;
    a drill mounted on said carriage so that said drill is vertically and laterally movable with respect to said carriage;
    a masher mounted on said carriage so that said masher is vertically and laterally movable with respect to said carriage;
    a sensor operably mounted to said carriage so that at a first position a next position is detectable by said sensor;
    a drive in communication with said carriage for moving said carriage relative to the work piece; and
    a control system having a processor in operative communication with said carriage, said drill, said masher, said sensor, and said drive,
    said processor having a first mode, wherein in said first mode said processor repeatedly performs the steps of operating said drill at said first position, storing said first position as a previous position, receiving said next position from said sensor, and driving said drill on said carriage to said next position.

29. The automated drill and rivet machine as in claim 28, wherein said processor has a second mode, wherein in said second mode, said processor repeatedly performs the steps of returning said masher on said carriage to said previous position and operating said masher.

30. The automated drill and rivet machine as in claim 28, wherein said carriage includes a threaded screw for moving said machine relative to the work piece.

31. The automated drill and rivet machine as in claim 28, wherein said carriage includes wheels and an electric motor in driving communication with said wheels for movement of said carriage relative to the work piece.

32. The automated drill and rivet machine as in claim 28, wherein said machine includes a track substantially parallel to the work piece for moving said machine adjacent to the work piece.

33. The automated drill and rivet machine as in claim 32, wherein said carriage includes a floating bearing assembly in contact with said track, wherein said bearing assembly has a fixed bearing on a first side and a floating bearing on a second side.

34. The automated drill and rivet machine as in claim 28, wherein said drill includes a motor operably connected to a chuck holding a drill bit.

35. The automated drill and rivet machine as in claim 28, wherein said masher includes a buck plate, a mash plate slideably opposed to said buck plate, and a ram operably connected to said buck plate and said mash plate for moving said buck plate with respect to said mash plate.

36. The automated drill and rivet machine as in claim 28, wherein said sensor includes a laser sensor.

37. The automated drill and rivet machine as in claim 28, wherein said processor in said first mode directs said drill at a variable rate.

38. A method for automatically fastening components, comprising at least the following steps:

provniding a machine on a carriage movable relative to the components, wherein said machine includes a drill, a masher, a sensor, and a processor;

indexing said machine to a first work site;

placing said machine in a first mode in which said machine repeatedly performs the steps of drilling at said first work site, storing said first work site as a previous work site, sensing a next work site, and moving said drill on said carriage to said next work site;

inserting a fastener at said previous work site;

placing said machine in a second mode in which said machine repeatedly performs the steps of moving said masher on said carriage to said previous work site and mashing at said previous work site.

* * * * *